United States Patent

[11] 3,607,441

| [72] | Inventor | Renard E. Mix<br>Yorktown, Ind. |
|---|---|---|
| [21] | Appl. No. | 879,379 |
| [22] | Filed | Nov. 24, 1969 |
| [45] | Patented | Sept. 21, 1971 |
| [73] | Assignee | General Motors Corporation<br>Detroit, Mich. |

[54] PROCESS FOR MAKING BATTERY TERMINALS
9 Claims, 7 Drawing Figs.

[52] U.S. Cl. .................................... 136/176,
136/135 S, 136/168
[51] Int. Cl. .................................... H01m 5/00
[50] Field of Search .......................... 136/176,
170, 135

[56] References Cited
UNITED STATES PATENTS

| 1,960,200 | 5/1934 | Beetem ........................ | 136/168 |
| 2,505,207 | 4/1950 | Riggs ........................... | 136/135 S |
| 3,303,056 | 2/1967 | Sabatino et al. ............. | 136/168 |

*Primary Examiner*—Donald L. Walton
*Attorneys*—William S. Pettigrew, R. J. Wallace and Lawrence B. Plant ABSTRACT: A method of making a storage battery in which a terminal and a terminal-carrier are molded about a hollow core of hard metal. The terminal-carrier is molded into the core at the beginning of the process, used to facilitate handling of the terminal during processing, and discarded after the terminal is joined to the battery.

PATENTED SEP 21 1971
3,607,441
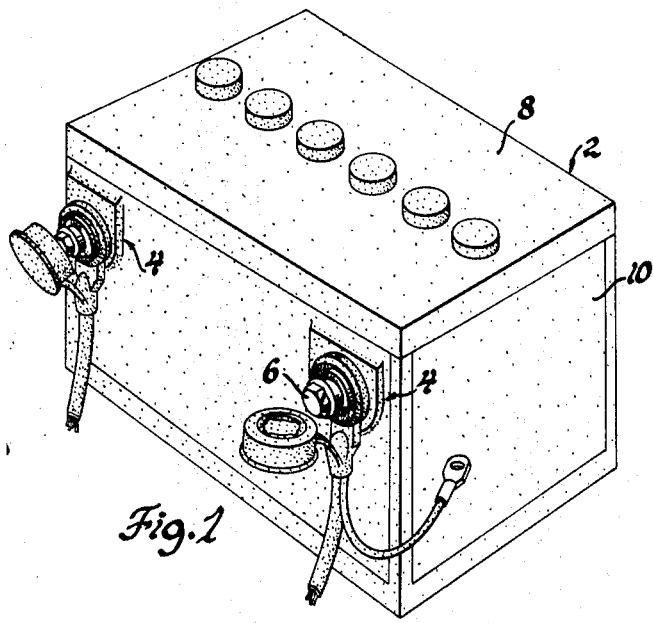
Fig.1
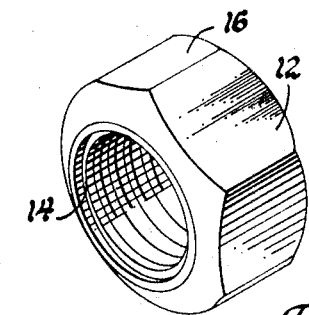
Fig.2
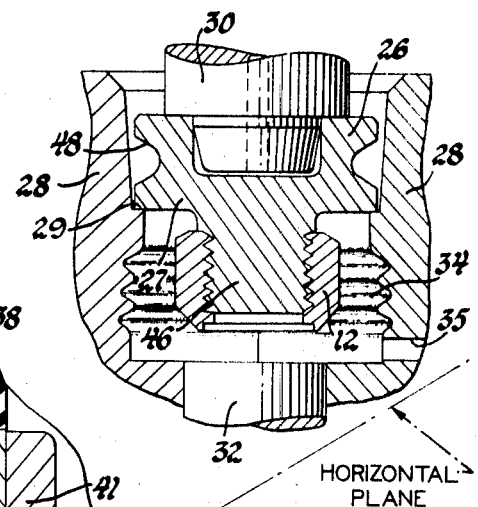
Fig.4
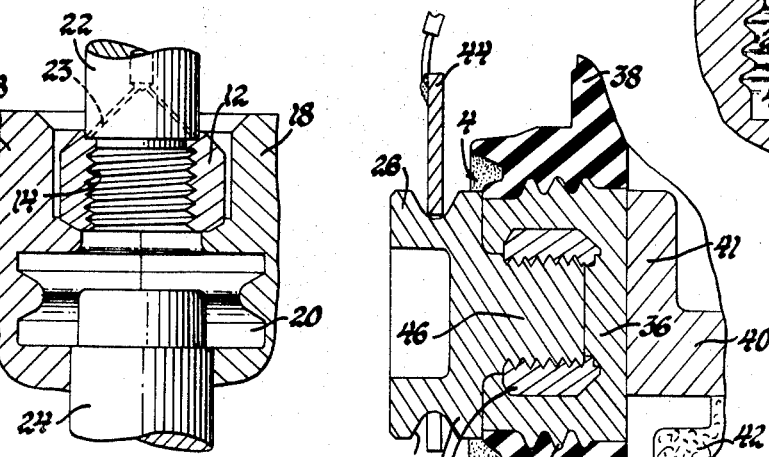
Fig.3
Fig.5
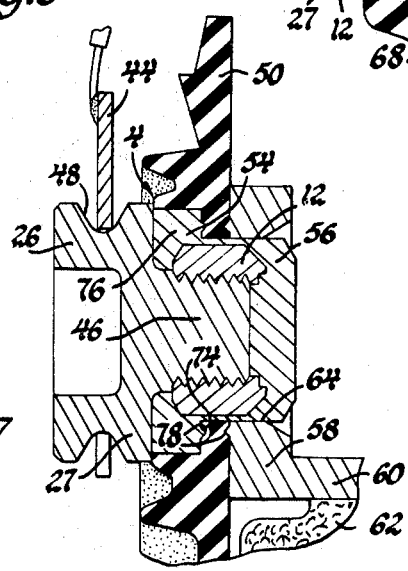
Fig.7
Fig.6
INVENTOR.
Renard E. Mix
BY
Lawrence B. Plant
ATTORNEY

PROCESS FOR MAKING BATTERY TERMINALS

This invention relates generally to the manufacture of batteries and more particularly to the manufacture of sealed-terminal lead acid storage batteries of the type described in U.S. Pat. application Ser. No. 799,666, entitled Corrosion Proof Battery Terminal and Cable Connector Therefor, filed Feb. 17, 1969, in the name of G. A. Rowls et al., and assigned to the assignee of this invention.

An ability to reduce manufacturing costs while still maintaining product quality is a necessity if profits are to be realized in the highly competitive battery industry This invention eliminates the individual handling of an untoward number of separate parts prior to assembly into a battery, and, at the same time consistently produces a reliably sealed terminal. The costly batchwise manufacture and handling steps required for processing numerous discrete parts into a finished assembly are eliminated by this process. Rather, by this process, a terminal-carrier and terminal-bushing are sequentially molded about an internally threaded core and only one discrete part requires handling during processing. Handling is facilitated by providing the part with a terminal-carrier which is separated from the terminal and discarded when the battery is finished.

It is an object of this invention to provide an economical process for forming a reliably sealed battery terminal in which a terminal-carrier and a terminal are molded about an internally threaded core and in which the terminal-carrier is used to facilitate handling of the terminal during processing only to be discarded at the end of processing.

It is another object of this invention to provide a process for molding a separable lead composite article in which molten lead is molded against solid lead without interfusion at their juncture and without the specific application of mold release agents.

These and other objects of my invention will become more apparent from the detailed description which follows.

FIG. 1 is a perspective view of a battery made in accordance with the teachings of this invention.

FIG. 2 is a perspective view of an internally threaded core about which a terminal-carrier and terminal-bushing are molded.

FIG. 3 is a sectioned, elevational view illustrating the molding step in which a terminal-carrier is molded to the core.

FIG. 4 is a sectioned, elevational view illustrating the molding step in which a terminal bushing is molded to the core and terminal-carrier.

FIG. 5 is a sectioned, elevational view illustrating a battery case wall molded about the terminal-bushing.

FIG. 6 is a sectioned, elevational view illustrating the molding of another bushing embodiment of this invention, and FIG. 7 is a sectioned, elevational view illustrating the joining of the bushing of FIG. 6 to a connector strap through an aperture in a case wall.

This invention comprehends a battery-manufacturing process in which a terminal-carrier and a terminal-bushing are molded about a core and in which the carrier is used to facilitate handling and positioning of the terminal during processing and then discarded after the battery is finished. In one embodiment, a battery container wall is itself molded about the terminal. In another embodiment, the molded terminal is inserted through apertures in a battery container wall and a plate strap lug, deformed into rivetlike engagement with the lug and sealing engagement with the wall and subsequently fused to the lug. A particularly significant aspect of this invention is the molding of a spoollike, terminal-carrier which is used during processing as a means for handling and positioning the terminal throughout its processing and finally as a means for attaching the electrical connections during plate formation. When the battery plates are completely formed, the carrier is removed and discarded. Another significant aspect of this invention resides in the technique for molding a lead terminal bushing against the lead terminal-carrier without forming a permanent bond therebetween. This later aspect is accomplished by aging the terminal-carrier intermediate the process to cool the carrier and form a bond-inhibiting oxide film on the surface of the carrier.

FIG. 1 shows a battery 2 having a case 10, a cover 8, terminals 4 and a cable connector 6 adapted to engage the terminals 4. Though shown in the case 10, the terminal 4 could extend through the cover 8.

The terminal 4 is formed in a series of operations beginning with the selection of a core 12. FIG. 2 shows a preferred core 12 having an internally threaded bore 14 and an antitwist outside configuration 16. In the particular embodiment shown, the core 12 comprises a steel hex nut. Stainless steel is preferred because of the corrosive environment surrounding the battery, but other hard metals including low-carbon steel can also be used.

As best shown in FIG. 3, the core 12 is first positioned in a mold 18 which has two mold halves defining a mold cavity 20. The core pin 22 holds the core 12 in the mold 18 and also serves to close the end of the threaded bore 14. The cavity 20 is vented through vents 23 in the pin 22. A second core pin 24 projects into the mold cavity 20. Appropriate injector ports or gates (not shown) are provided in the mold 18. Molten lead or lead alloy is injected into the cavity 20 to form the spoollike carrier 26 which has a flange 27 and a projection 46 best shown in FIGS. 4–7. The core 12 and carrier 26 are released from the mold 18 and, as a composite carrier-core, aged for a time sufficient to cool the carrier to about room temperature and to form a thin natural oxide film on the exposed lead. This aging normally takes at least about 8 hours for adequate natural oxide formation with about 24 hours being preferred. With adequate aging no mold release or parting agents are needed between contiguous lead portions of the terminal during the subsequent molding operations. Oxide formation could be accelerated through the use of heat or a strong oxidizing environment, but only at the sacrifice of increased cost.

The aged composite carrier-core is placed in a second mold 28 having an open-mouthed cavity 34, best shown in FIG. 4. Core pin 30 holds the flange 27 of the carrier 26 in place at the mouth 29 of the cavity 34. The core 12 is located centrally of the cavity 34 and is held therein by the projection 46 on the carrier 26. Core pin 32 closes the cavity 34. Appropriate gates 35 are provided in the mold 28 to admit lead to the cavity 34. The gates 35 are preferably located at the bottom of the cavity 34 so that the incoming lead flows upwardly into contact with the core 12 and carrier 26 and so that the hot incoming lead will not impinge on the lead carrier 26. The combination of this arrangement for gating and the oxide film on the carrier ensures the separability of the carrier 26 from the bushing 34 later in the process. No mold release or parting agents per se are required. The cavity 34 is vented (not shown) to ensure that no air is entrapped in the lead during solidification. In a preferred embodiment, lead as hot as 800° F. is introduced into a 0.207-in.$^3$ cavity 34 at right angles to the axis of the core and at a rate of about 1.035 in.$^3$/sec. to produce the terminal bushing 36 shown in FIG. 5. Lower lead temperatures have also been used successfully.

After solidification, the three-component composite (i.e., carrier-core-bushing) is sandblasted to roughen the outside surface of the bushing. The composite is then placed in a battery case mold (not shown). The composite is held in the case mold by means of the carrier 26 such that the bushing 36 extends completely through a portion of the case mold cavity which forms a case wall. The case-forming material, e.g., hard rubber, plastic, or the like, is injected into the case mold, forming the case wall 38 about the terminal bushing 36 proving a highly reliable electrolyte seal. The bushing 36 has an antiextraction and antitwist configuration 68 comprising a series of annular protuberances for antiextraction purposes and spaced webs (not shown) between the protuberances for antitwist purposes. This configuration prevents the bushing from being either pulled out of, or turned in, the case wall 38 in normal usage. Similarly, the inside end of the bore 14 of the core 12 can be staked so that foreign bolts cannot be turned too far into the bore 14 and thereby damage the terminal.

The case, with the terminal embedded therein, is removed from the case mold and filled with the batteries' active elements, i.e., the positive and negative plates. The terminal is appropriately connected to the plates. In this regard, there is provided a plate strap 40 which joins a plurality of plates 42 which, depending on the cell involved, are either all positive or all negative plates. A plate strap lug 41 on the strap 40 is fused to the inside face of the bushing 36 to complete the connection.

The carrier 26 could be removed at this point, but preferably it remains with the assembled battery until after the plates have been electrochemically formed. In this regard, carrier 26 is provided with an annular groove 48 adapted to mate with a clip 44 which serves to conduct the formation current to the battery terminals. After plate formation, the carrier 26 is removed and discarded. Separation of the carrier 26 from the bushing 36 is possible since no bond has been formed between these two parts during processing. Bonding is substantially prevented by the combination of the aging step and the technique for introducing the lead into the cavity 34. Removal of the carrier 26 leaves a socket in the core 12 and bushing 36 which socket is adapted to engage a complementarily shaped connector on a cable connector 6, i.e., a threaded bolt. The carrier 26 is melted and the lead reused.

In another embodiment shown in FIG. 6, the core 12 and carrier 26 are inserted into a mold 66 which defines an open-mouthed mold cavity 52. A core pin 70 holds the carrier 26 and core 12 in the mold 66 with the flange 27 of the carrier 26 closing the mouth of the cavity 52. The core pin 72 completely closes off the cavity 52 except for appropriate vents and gates (not shown). Molten lead is injected into the cavity 52 to form the bushing 54. The bushing 54 has a flanged portion 76 and a projection 56, and is specifically adapted for use with thin-wall battery cases where it is impractical to have the battery case molded about the bushing. In batteries featuring this embodiment, the projection 56 extends through an aperture 74 in a case wall 50 and into and aperture 64 in a plate strap lug 58. Plates 62 are fused to a plate strap 60 intermediate the lug 58 and plates 62. The end of the projection 56 is next mechanically deformed, as by a riveting operation, to tightly engage the lug 58. The flanged portion 76 of the bushing 54 and the lug 58 sandwich the case wall 50 between them. The riveted joint is next heated with a torch to interfuse the projection 56 and the lug 58. Annular projections 78 bite into the case wall 50 to improve the electrolyte seal.

During the bushing molding step, the molds are so gated as to ensure that the incoming lead does not directly impinge on the lead carrier which could cause melting of the carrier and interfusion of the bushing and the carrier at their juncture. Further, the lead is introduced into the bottom of the bushing cavity and rises in the cavity allowing it to cool somewhat before contacting the core and carrier which have cooled substantially during the aging process. the cool, core-carrier composite acts as a heat sink which chills the lead front before it can fuse to the carrier and further reduces the likelihood of an interfused bond being formed between the carrier and the bushing. Aging the carrier for at least about 8 hours, and preferably about 24 hours, causes an oxide film to build up on the carrier. This film further prevents interfusion between the carrier and the bushing melt. If, for some reason, aging is not possible, then parting agents or mold release agents such as silicone or the like may be used. Other mold release agents which might be used are silicone oil emulsion in water, talc or other earthen powders, scrap stone powder, carbon black, moldcoat, graphite base emulsions, oxides of lead or letharge. However, the use of mold release agents introduces impurities into the molds and the moldings which impurities take their toll in terms of processing time and product quality. Accordingly, mold release agents should only be used when, for some reason, time will not permit aging the carrier-core composite to form an adequate oxide film on the carrier. Another technique which can be used to prevent interfusion between the bushing material and the carrier is the use of a carrier material which has a much higher melting point than that of the bushing material.

Care should be taken that no air is entrapped in the bushing during molding. Entrapped air pockets in the bushing tend to explode while the bushing is being fused to the plate strap lug and interferes with the formation of a good joint between the terminal and the lug. The location and size (i.e., large) of the gate openings, cavity venting and lead injection rate into the bushing mold are significant factors in both reducing air entrapment and preventing interfusion of spool and bushing. A preferred technique for casting the bushing in the cavity 34 involves the use of 0.100-inch gates which open into the mold so that the streams of molten lead enter perpendicularly to the axis of the bore 14 in the core 12. The mold is maintained at a temperature between about 100° F. and about 140° F. while the incoming lead alloy is heated to between about 750° F. and 800° F. Injection rates can range from about 0.60 in.$^3$/sec. to about 1.47 in.$^3$/sec. The most effective injection rates, however, are between about 1.10 in.$^3$/sec. to about 0.82 in.$^3$/sec. The faster injection rates tend to cause more fusion between the carrier and bushing and cause too much air to be entrapped. On the other hand, the slower injection rates show less of a tendency to cause fusion or air entrapment but cause more cold shots to occur. A particular example of the casting operation involves the use of a 0.207-in.$^3$ cavity which is filled through a 0.100-inch gate at a rate of 10.95 ft./sec.

While this invention has been disclosed primarily in terms of specific embodiments thereof, it is not intended that it be limited thereto except to the extent hereinafter set forth.

I claim:

1. A method of making a lead acid storage battery having active elements of alternately spaced positive and negative plates, container means for said active elements and a terminal for electrically communicating said active elements with the outside of said container through a wall of said container said method comprising the steps of providing a hollow core which defines a socket adapted to receive a complementarily shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, providing a second mold having second walls defining a second open-mouthed cavity, positioning said composite in said second mold contiguous the mouth of said second cavity with said flange seating in said mold closing said cavity and with said core within said second cavity, said second walls and said flange together defining a bushing-forming cavity, filling said bushing-forming cavity with molten lead and allowing it to solidify to form a bushing about the said core, joining said bushing to said active elements through a wall of said container means, and subsequently removing said carrier from said core.

2. A method of making a lead acid storage battery having active elements of alternately spaced positive and negative plates, container means for said active elements and a terminal for electrically communicating said active elements with the outside of said container through a wall of said container, said method comprising the steps of providing a hollow core which defines a socket adapted to receive a complementarily shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, providing a second mold having second walls defining a second open-mouthed cavity, positioning said composite in said second mold contiguous the mouth of said second cavity with said flange seating in said mold closing said cavity and with said core within said cavity, said second walls and said flange together defining a bushing-forming cavity, filling said bushing-forming cavity with molten lead and allowing it to solidify to form a bushing about the said core, joining said bushing to said active elements through a wall of said container means, filling said container means with electrolyte, connecting said carrier to a source of electrolyzing current, passing said current through said carrier, bushing, active elements and electrolyte to electrolytically form said positive and negative plates in said container, and subsequently removing said carrier from said core.

3. A method of making a lead acid storage battery having active elements of alternately spaced positive and negative plates, container means for said active elements and a terminal for electrically communicating said active elements with the outside of said container through a wall of said container, said method comprising the steps of providing a hollow core which defines a socket adapted to receive a complementarily shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, providing a second mold having second walls defining a second open-mouthed cavity, positioning said composite in said second mold contiguous the mouth of said second cavity with said flange seating in said mold closing said cavity and with said core within said second cavity, said second walls and said flange together defining a bushing-forming cavity, filling said bushing-forming cavity with molten lead and allowing it to solidify to form a bushing about the said core, providing a container mold having a container wall forming cavity therein, positioning said bushing in said container mold with said bushing traversing a portion of said container wall cavity, filling said container mold cavity with, and embedding said bushing in, an appropriate thermoplastic or thermosetting material to form said container, joining said bushing to said active elements in said container, and subsequently removing said carrier from said core.

4. The method as described in claim 3 comprising the additional step of abrasive blasting said bushing prior to embedding it in said thermoplastic or thermosetting material.

5. A method of making a lead acid storage battery having active elements of alternately spaced positive and negative plates, container means for said active elements and a terminal for electrically communicating said active elements with the outside of said container through a wall of said container, said method comprising the steps of providing a hollow core which defines a socket adapted to receive a complementary shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, providing a second mold having second walls defining a second open-mouthed cavity, positioning said composite in said second mold contiguous the mouth of said second cavity with said flange seating in said mold closing said cavity and with said core within said second cavity, said second walls and said flange together defining a bushing-forming cavity, filling said bushing-forming cavity with molten lead and allowing it to solidify to form a bushing about the said core, perforating a wall of said container, inserting a portion of said bushing into said aperture and through said container wall, joining said portion to said active elements in said container, and subsequently removing said carrier from said core.

6. A method of making a lead acid storage battery having active elements of alternately spaced positive and negative plates, container means for said active elements and a terminal for electrically communicating said active elements with the outside of said container through a wall of said container, said method comprising the steps of providing a hollow core which defines a socket adapted to receive a complementarily shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, cooling and forming a bond preventing oxide film in situ on the surface of said carrier, providing a second mold having second walls defining a second open-mouthed cavity, positioning said composite in said second mold contiguous the mouth of said second cavity and with said flange seating in said mold closing said cavity and with said core within said second cavity, said second walls and said flange together defining a bushing-forming cavity, filling said bushing-forming cavity with molten lead and allowing it to solidify to form a bushing about the said core, joining said bushing to said active elements through a wall of said container means, and subsequently removing said carrier from said core.

7. A method of making a lead acid storage battery having active elements of alternately spaced positive and negative plates, container means for said active elements and a terminal for electrically communicating said active elements with the outside of said container through a wall of said container, said method comprising the steps of providing a hollow core which defines a socket adapted to receive a complementarily shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, aging said composite in an oxidizing atmosphere to cool said composite and to form a bond preventing oxide film in situ on the surface of said carrier, providing a second mold having second walls defining a second open-mouthed cavity, positioning said composite in said second mold contiguous the mouth of said second cavity with said flange seating in said mold closing said cavity and with said core within said second cavity, said second walls and said flange together defining a bushing-forming cavity, filling said bushing-forming cavity with molten lead and allowing it to solidify to form a bushing about the said core, joining said bushing to said active elements through a wall of said container means, and subsequently removing said carrier from said core.

8. A method of making a lead acid storage battery having active elements of alternately spaced positive and negative plates, container means for said active elements and a terminal for electrically communicating said active elements with the outside of said container through a wall of said container, said method comprising the steps of providing a hollow core which defines a socket adapted to receive a complementarily shaped battery cable connector, providing a first mold having first walls defining an open-mouthed cavity, positioning said core in said mold contiguous the mouth of said cavity with said socket opening into said cavity, said first walls and said socket together defining a carrier-forming cavity, filling said carrier-forming cavity with molten lead and allowing the lead to solidify to form a carrier-core composite having a flange and a core-engaging projection extending from said flange into said socket, aging said composite in ambient air for at least about 8 hours to cool said composite and to form a bond preventing oxide film in situ on the surface of said carrier, providing a second mold having second walls defining a second open-mouthed cavity, positioning said composite in said second mold contiguous the mouth of said second cavity with said flange seating in said mold closing said cavity and with said core within said second cavity, said second walls and said flange together defining a bushing-forming cavity, filling said bushing-forming cavity with molten lead and allowing it to solidify to form a bushing about the said core, joining said bushing to said active elements through a wall of said container means, and subsequently removing said carrier from said core.

9. The method as described in claim 8 wherein said composite is aged for at least about 24 hours.

PO-1050
(5/69)

UNITED STATES PATENT OFFICE
CERTIFICATE OF CORRECTION

Patent No. 3,607,441              Dated September 21, 1971

Inventor(s)           Renard E. Mix

It is certified that error appears in the above-identified patent and that said Letters Patent are hereby corrected as shown below:

In the specification, Column 4, line 16, "100°F" should read -- 110°F --.

In the Claims, Claim 2, Column 5, line 3, after the second "said", insert -- second --. Claim 8, Column 6, line 69, "molter" should read -- molten --.

Signed and sealed this 11th day of April 1972.

(SEAL)
Attest:

EDWARD M. FLETCHER, JR.                ROBERT GOTTSCHALK
Attesting Officer                       Commissioner of Patents